Mar. 13, 1923.

E. R. LOCHMAN.
PROPELLER.
FILED OCT. 19, 1918.

Inventor
Emil R. Lochman
By Yowell, Kenney & French
Attorneys.

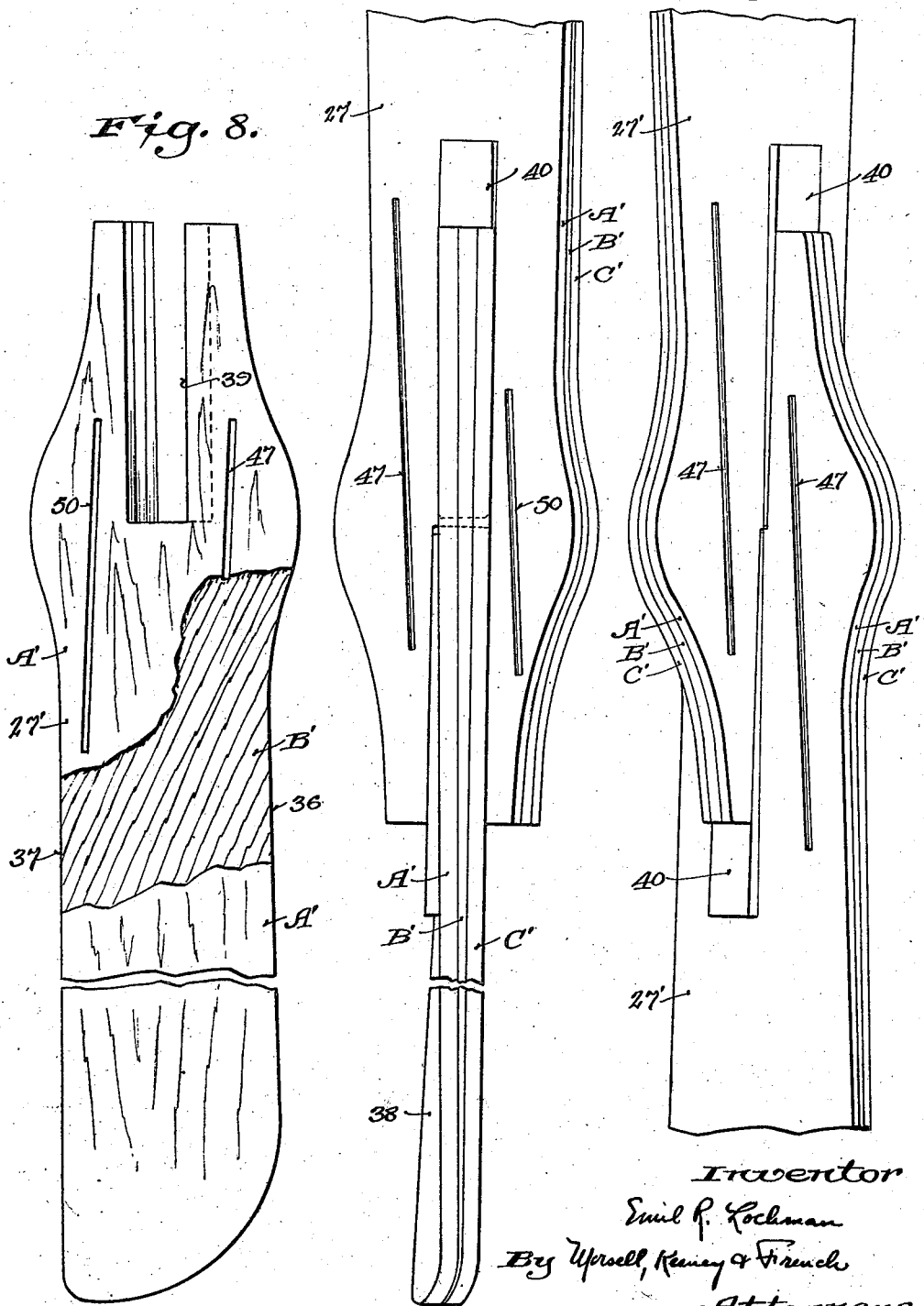

Mar. 13, 1923.
E. R. LOCHMAN.
PROPELLER.
FILED OCT. 19, 1918.
1,447,994.
4 SHEETS—SHEET 3.
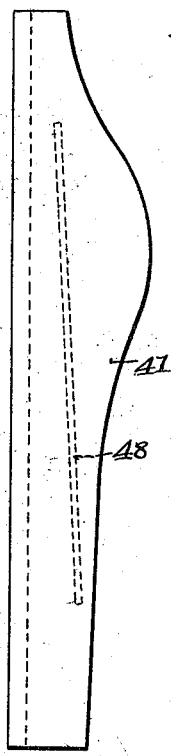
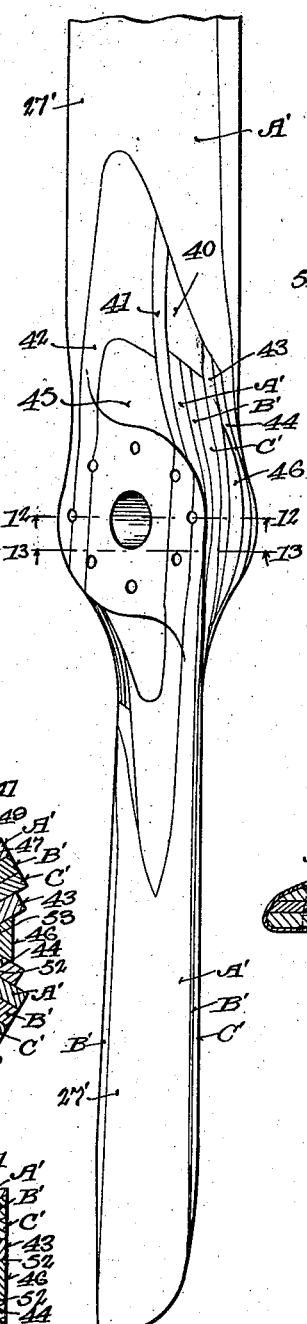
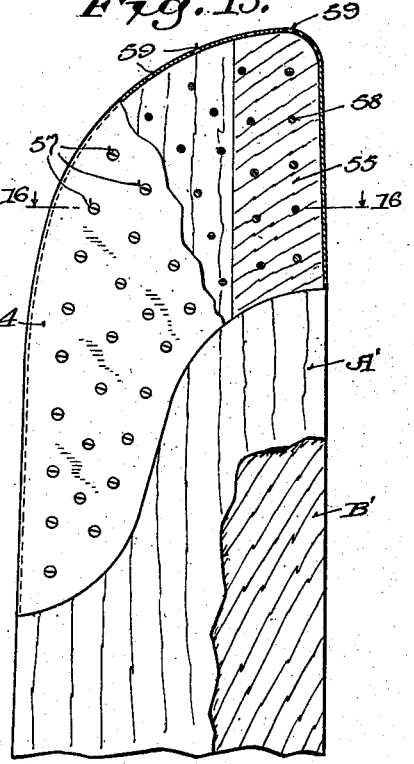
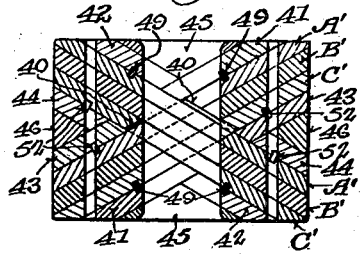
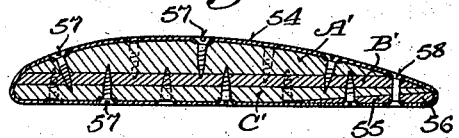
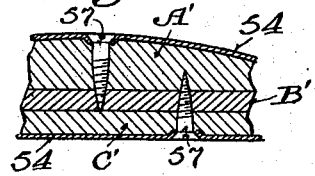

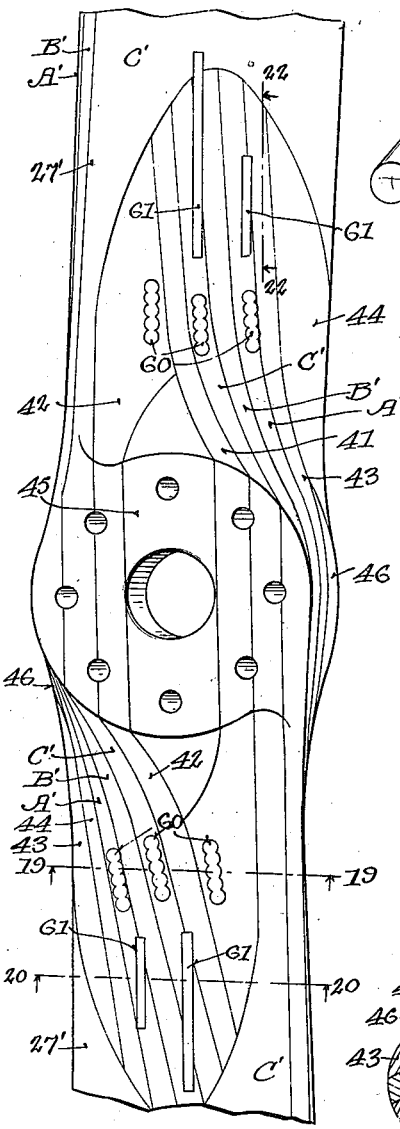
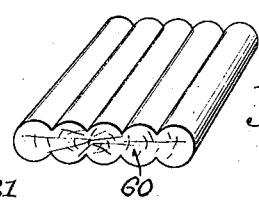
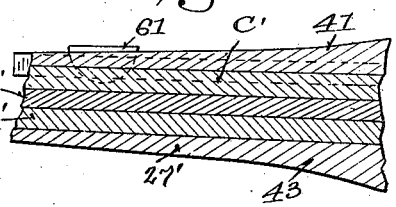
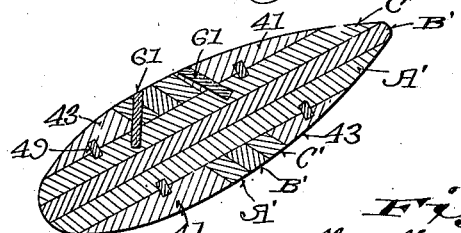
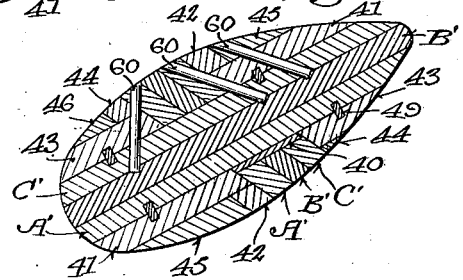
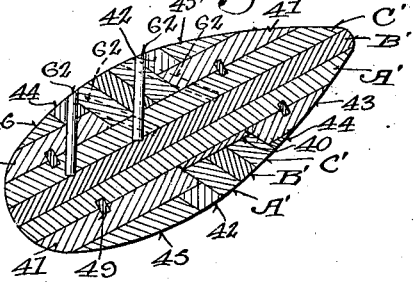
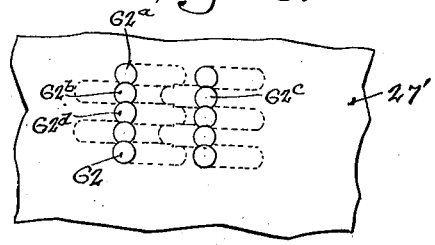

Patented Nov. 3, 1931

1,830,695

UNITED STATES PATENT OFFICE

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT

CAPPED CONTACT PIN

Application filed April 25, 1930. Serial No. 447,395.

This invention has to do with a contact pin of the type having a cap over its inner or attaching end, as described in my copending application Serial No. 305,296 filed September 11, 1928. The present invention is an improvement on the pin there described in that it does away with the need of making an anchorage shoulder on the main body of the pin, and yet provides such a shoulder in a simpler way, that is, by flanging the cap at its open end.

A pin made in accordance with this invention is described hereinafter with reference to the accompanying drawings in which, Figure 1 is a view in central vertical section through a flanged cap.

Figure 1:
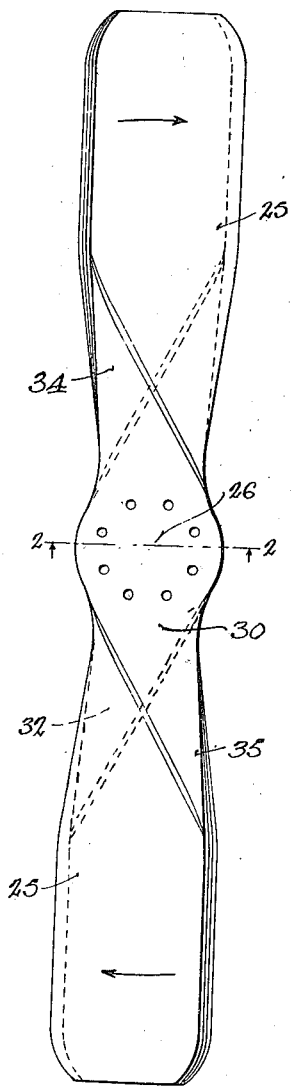
Figure 3:
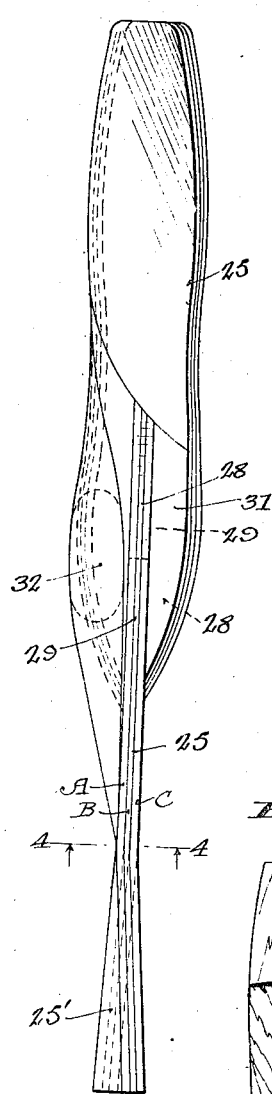
Figure 3 is a view in elevation of the pin with the cap in place, the cap being shown in section.
Figure 5:
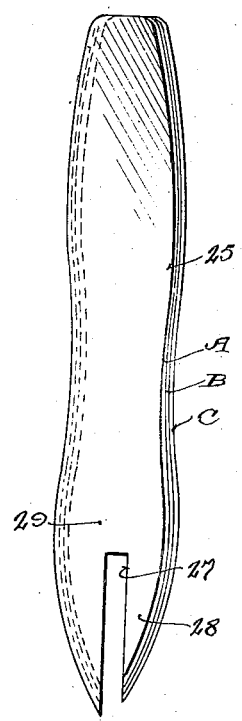
Figures 6, 7:
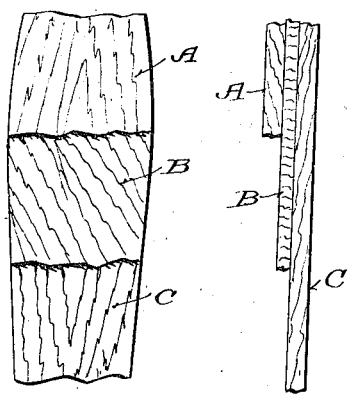
Figure 2:
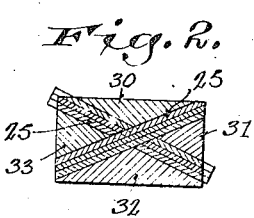
Figure 2 is a view in elevation of a pin made to receive that cap.
Figure 4:
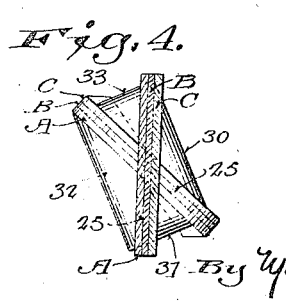

The pin 10 shown here is made of sheet metal in tubular form with a longitudinal seam 11. At its lower end 12 the wall of the pin is drawn in to decrease the size of the opening and thus to facilitate the soldering of the filament to the pin. The soldering may be done in the manner described in the Gagnon Patent No. 1,702,234. The upper or attaching end of the pin, sometimes called the head, is necked down so that there is an inwardly tapered portion 15 ending at an annular shoulder 16. The latter presents a surface that is substantially at right angles to the axis of the pin. The material of the pin is turned in at the top giving an end wall 17 with a hole 18 in it.

The cap 20 is made from sheet metal in the form of a cup with an annular flange 21, substantially at right angles to its axis, at its open end. If the cap is pre-formed with a flange, then to attach it to the pin, the cap is placed over the tapered head of the pin until its end wall 22 rests against the top wall 17 and then it is clinched against the sides of the tapered head in any suitable way to produce a secure union. The flange 21 is not disturbed, the effect of the compression being only to bring the base of the flange in upon the shoulder 16.

For quantity production it is preferable not to pre-form the flange but to start with simply a cup, of greater depth however than that desired for the final flanged cap. Such a cup is fed to a die containing the pin and having an inwardly tapered portion around the head of the pin. As the cup advances into this portion and into position over the head of the pin its side wall is necked down to bring it against the sides of the pin. There should be an annular shoulder opposite the shoulder 16 of the pin to engage the rim of the cup and flare it as it advances until the end wall of the cup comes against the end wall of the pin. The result is a flanged cap clinched against the tapered head of the pin.

The pin is designed especially for being molded into a base by the method (set forth in my copending applications, Serial No. 56,-292, filed September 14. 1925, and Serial No. 202,082 filed June 28, 1927) which involves the shaping of the base material about the heads of the pins while simultaneously opening a wireway to the interior of the pin. The capped pins are set up in recesses in the fixed die with the tapered head portions, above the flanges 21, extending into the mold cavity. The base material is put in around the heads and then the forming die, which is provided with conical projections registering with the pins, is brought down to press the material into shape. In the course of the shaping, the conical projections push through the base material and pierce the end walls 22 of the caps on the pins which theretofore have excluded the base material from the interiors of the pins. Thus the wireways are opened to the interior of the pins.

The pin is held securely in the base by reason of the fact that there is a portion of reduced diameter between the flange 21 and the top of the tapered portion. The taper serves also to restrain the pin from swiveling and the engagement with the base material prevents rotation.

The simplification and resultant economy, gained by the provision of a flanged cap, are considerable and represent an advance in ping these slotted portions together so that the slotted end portion 28 of one blade overlaps a portion 29 of the other blade in which position said blades are glued together. The blades, joined in this fashion, extend through the whole surface of the hub with the end portions 29 reaching beyond the hub on either side and thereby brace each other, providing a strong joint and hub which will resist the centrifugal force and thrust of the blades, when in operation, without breaking. Filler pieces 30, 31, 32 and 33 are then joined and glued to the hub portion of the propeller blank with their grain and straight surface joints running lengthwise with the blades, so that the hub of the propeller now forms a solid mass of wood with its grain, excepting the laminations B, running lengthwise with the propeller blades. These filler pieces also extend a considerable distance beyond the hub and they are roughly cut into the outline as shown in Fig. 1, and the pointed ends 34 and 35 reach to about one-half of the length of the respective blades whereby the blades are reinforced and held in their proper shape.

It is to be understood that any number of laminations may be used for each blade or each may be formed out of one plank and joined together in the manner previously described so that, while I prefer the construction just described, I do not limit my invention to blades having three laminations.

The fully prepared blank, as shown in Fig. 1 is then shaped and finished off into its completed form.

Referring now to Figs. 8 to 14 inclusive, I have shown certain improvements on the construction previously described, though the general method of constructing the propeller is the same. In this form each blade 27' is formed of three laminations A', B' and C' as before with the grain of the wood of these laminations disposed as previously described so that the grain of laminations A' and C' run lengthwise of the blade and that of lamination B' running rearward and outward from the leading edge 36 to the trailing edge 37 of the blade. The laminations A', B' and C' are not, however, of uniform width but tapered from their inner ends toward the tip of the blade as clearly shown in Fig. 9. Each lamination is treated with steam and then has its outer portion 38 pressed into the proper relatively varying screw pitch form after which the laminations are glued together, set and dried and are then joined as previously described by means of the slots 39 similar to the slots 27 of the previously described construction so as to give the blades the proper general pitch. To firmly interlock the blades together, a wedge 40 is used for each slotted portion of the joint, said wedge being inserted between one of the outer sides of one blade and one of the sides of the slot of the other blade and firmly driven in and glued.

To complete the hub and reinforce the blades for a portion of their length at a distance from the hub, wooden end filler pieces 41 and 42 and wooden side filler pieces 43 and 44 together with filler pieces 45 and 46 are connected together in the following manner:

The blades have key ways 47 cut in them at a slight angle as shown in Figs. 8 to 10 inclusive and the end filler pieces 41 and 42 have similar keyways 48 cut therein and adapted to register with the keyways 47 in the blades, Fig. 14 showing a general view of the end piece 41. These end filler pieces are then secured to the blades by means of keys 49, the piece 41 being first glued and keyed as shown in Figs. 12 and 13 and the piece 42 being then glued and keyed as shown so that its inner edge abuts against the piece 41 and the filler pieces 45 are then joined and glued to the pieces 41 and 42. The grain of wood of the pieces 41, 42 and 45 runs lengthwise with the blades.

The blades have keyways 50 cut in them at a slight angle and the side filler pieces 43 and 44 have similar keyways 51 cut therein and adapted to register with the keyways 50 in the blades. These side filler pieces are then secured to the blades by means of keys 52, the piece 43 being first glued and keyed as shown and the filler pieces 46 are then joined by means of dowels 53 and glued to the pieces 43 and 44. The fully prepared blank is then shaped into the completed form shown in Fig. 11.

In certain branches of the aviation service particularly in the naval work it is necessary to reinforce and protect the tip of the propeller against sand and pebbles and while a brass tip is usual in the present instance I provide a special construction for receiving the brass tip 54 in that the trailing edge of the blade adjacent the tip is provided with a wooden tip plate 55 whose grain runs at an angle to that of the grain of the laminations A and whose outer edge 56 is thick to reinforce the tip edge. The tip 54 is secured to the blade by screws 57 and rivets 58 and is provided with vent holes 59.

Referring to Figs. 18 to 24 inclusive I here show various methods for additionally keying the parts together adjacent the hub of the propeller shown in Fig. 11. In Fig. 21 I show a peculiar form of key 60 having corrugated sides and this is driven into the propeller adjacent the hub as shown in Fig. 18, the key seat being formed by drilling a series of holes in the propeller which partially overlap one another. In Fig. 22 I have a wooden Woodruff key 61 and in Fig. 18 I show how these keys are used while Figs. 19 and 20 show sectional views with the keys 60 and 61 in place.

Instead of using the form of keying shown in Fig. 21 I may use cylindrical keys 62 and so group them together as to form an interlocked construction as shown in Figs. 23 and 24. Referring to Fig. 23 one of the keys 62$^a$ is inserted in a previously drilled hole and then a hole is drilled next to this key and overlapping a part of it, and the next key 62$^b$ inserted but at an angle to the first key and this keying may be arranged in rows so that the lower end of a key in one row engages the lower ends of spaced apart keys in the adjacent row as the key 62$^c$ which at its lower end extends through a part of the lower ends of the keys 62$^a$ and 62$^d$ thereby forming a construction in which the keys are firmly interlocked.

In both of the forms of the propeller holes 63 are drilled through the hub to receive the bolts for securing the metal hub plates to the propeller and since the blades are at an angle to each other the bolts inserted in these holes will pass through the hub portions of both blades which of course produce a strong construction.

One of the important features of the construction shown in Figs. 8 to 11 inclusive is the use of the inner lamination B′ which due to the disposition of the grain at an angle to that of the other laminations greatly strengthens the propeller so that it will withstand the twisting strain against the blade brought about by the thrust and so that it will withstand the centrifugal strain due to the centrifugal force set up in the rapidly revolving blades and the tapering of this lamination is such as to properly take care of these strains at the various sections of the blade. As will be apparent in Figs. 9 and 10 the inner lamination B′ is tapered the most, and said lamination being formed and bent into its proper shape to form the blade in the rough and it will be readily seen that the final forming of the blade will not affect the thickness or the relative screw pitch of said lamination B′ as all the finishing is done on the outer laminations A′ and C′.

I prefer to use a wood of tougher fibre for the inner lamination B′ as it greatly strengthens the blade to resist the twisting strain which ordinarily causes a flutter of the propeller and in practice I use mahogany for the outer laminations A′ and C′ and tougher wood as walnut for the inner lamination B′.

When the ordinary blade is provided with a brass tip which is usually secured to the propeller by screws, it has been found in practice that the straight grain of the wood at the tip is not strong enough to hold the brass tip against the splitting of the tip of the propeller and the loosening of the tip by reason of the centrifugal force acting upon the brass tip and tending to move it and the fastening screws away from the propeller, with the result that the screws will be torn out of the blade tips and will tend to split the ends of the bade. Referring now to Figs. 15 to 17 inclusive, it will be noted that these disadvantages above pointed out have been overcome by constructing the tips of the blades of wooden laminations with the grains of the wood running at angles to each other so that when the fastening screws for the brass tips are secured within the tips of the blades they will be firmly held in place and will not tend to split or tear the blade because the cross grain laminations hold them firmly against movement. It will be noted that the laminations are laid parallel with the surface of the propeller blade so that all or most of the screws reach into or through the central lamination B′.

What I claim as my invention is:

1. A propeller having two blades, each blade having laminations extending the width and length of the blade and secured together, each of said blades having slotted inner ends joined together at an angle forming the general pitch of said propeller.

2. A propeller having two blades, each blade having a centrally disposed lengthwise extending slot at the hub end portion thereof, said slotted ends interlocking with each other at an angle to form the pitch of said propeller.

3. A propeller comprising a pair of separate blades, each of said blades having slotted inner ends, said slotted ends interlocking with each other at an angle forming the pitch of the blade, and filler pieces secured to the blades at the hub and extending beyond the hub to reinforce the blades.

4. A propeller comprising a pair of separate blades, each blade tapering lengthwise from its hub end to its tip, each blade having an inclined lengthwise extending slot, said slotted ends engaging each other at an angle to form the pitch of the propeller and wedges securing the slotted ends of the blades together.

5. A propeller comprising a pair of separate blades, each blade tapering lengthwise from its hub end to its tip, means for securing said blades together at the hub at an angle to each other to form the pitch of the propeller, and filler pieces secured in the outer recess formed by the blades at the hub.

6. A propeller comprising a pair of separate blades, each blade consisting of a plurality of laminations extending the length and width of the blade, means for joining said blades together in overlapping relation at the hub, filler pieces, and means for keying the filler pieces to the blades adjacent the hub.

7. A propeller comprising a pair of separate blades, means for joining the blades together, said blades having keyways therein adjacent, filler pieces provided with keyways registering with the keyways of the blades, keys in said keyways securing the filler pieces to the blades, and other filler pieces secured to the first named filler pieces.

8. A propeller comprising a pair of separate blades, means for joining the blades together at an angle to each other at their hub ends, each blade at its hub end having a longitudinally extending slot, said slotted ends interlocking with each other and having apertures therein passing through the hub portions of both blades to receive the bolts clamping the propeller to the driving shaft.

9. A propeller comprising two blades and a plurality of filler pieces, means for joining the blades together at their hub ends, means for securing the filler pieces to the blades where they are joined together, said blades and filler pieces having apertures therein extending through the hub portions of both of said blades and through said filler pieces to receive the bolts clamping the propeller between the flanges of its driving shaft.

10. A propeller comprising a pair of blades, means for joining the blades together at their hub ends, filler pieces secured to the blades where they are joined together, and keys passing through said filler pieces and into said blades.

11. A propeller comprising a pair of blades, means for joining the blades together at their hub ends, filler pieces secured to the blades where they are joined together, and keys passing through said filter pieces and into the blades and interlocking with each other.

12. In a propeller, the combination of a pair of separate blades and means for joining the inner ends of said blades together in cross-wise overlapping relation at and beyond the hub.

13. A propeller blade comprising a central lamination and two outer laminations, said central lamination being proportionately tapered from the hub section to the tip section and of tougher fibre than said outer laminations and the grain of the laminations running at angles to each other.

14. A propeller blade comprising a central and a series of outer laminations, said central lamination being of tougher fibre than said outer laminations and being tapered proportionately and extending with its thicker part through the entire hub section and its thinner part to the tip section of the blade.

15. A propeller comprising a pair of blades, said blades being tapered and provided with slots at their hub sections, and wedges for said slots to interlock said blades.

In testimony whereof, I affix my signature.

EMIL R. LOCHMAN.